Jan. 26, 1926.
L. G. CLARK
1,570,824
SURFACE WASHER
Filed Nov. 13, 1922
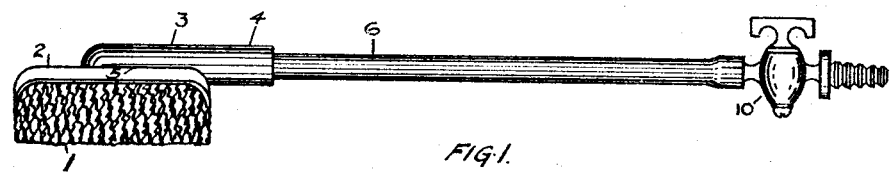
FIG.1.
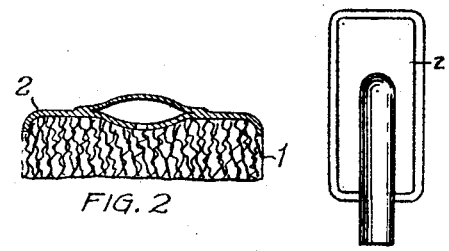
FIG.2.
FIG.3.
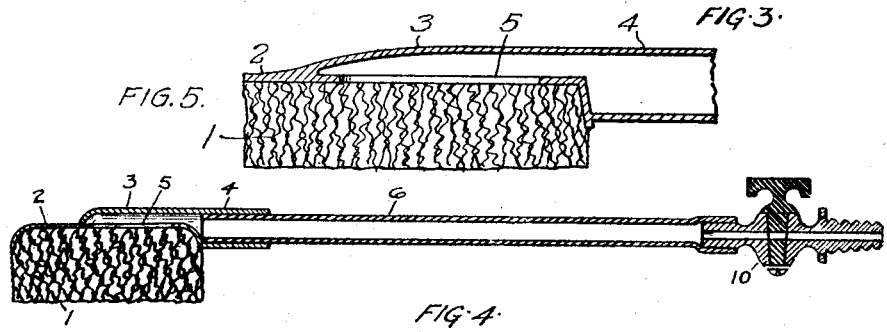
FIG.5.
FIG.4.
INVENTOR
L. G. Clark.
By E. J. Fetherstonhaugh.
ATTORNEY.

Patented Jan. 26, 1926.

1,570,824

UNITED STATES PATENT OFFICE.

LESTER GEORGE CLARK, OF MONTREAL, QUEBEC, CANADA, ASSIGNOR, BY MESNE ASSIGNMENTS, TO THE E. Z. AUTO WASHER COMPANY, OF NEW HAVEN, CONNECTICUT, A CORPORATION OF CONNECTICUT.

SURFACE WASHER.

Application filed November 13, 1922. Serial No. 600,507.

*To all whom it may concern:*

Be it known that I, LESTER GEORGE CLARK, a subject of the King of Great Britain, and residing at the city of Montreal, in the Province of Quebec, in the Dominion of Canada, have invented a new and useful Surface Washer, of which the following is the specification.

The invention relates to a surface washer as described in the present specification and shown in the accompanying drawings that form part of the same.

The invention consists essentially of the novel features pointed out broadly and specifically in the claim for novelty following a description containing an explanation in detail of an acceptable form of the invention.

The objects of the invention are to effect a thorough cleansing of motor cars and other vehicles, windows and other surfaces without constantly resorting to a water supply already contaminated by dirt from the surface being washed, to economize in time and labor in cleaning operations, to enable motorists to wash their own cars without difficulty; to facilitate the work of washing cars in public and private garages; to avoid scratches in finely finished surfaces, and generally to provide a washer for all kinds of surfaces that is self feeding, efficient in use and of a durable nature.

In the drawings Figure 1 is a side elevation of the washer and feed tube.

Figure 2 is a cross sectional view.

Figure 3 is a plan view of the upper side of the sponge.

Figure 4 is a longitudinal sectional view of the sponge and feed connection.

Figure 5 is a cross-sectional view through the pocket.

Like numerals of reference indicate corresponding parts in the various figures.

Referring to the drawings, the sponge 1 is preferably made of rubber and of parallelopipedal shape.

The sheet of rubber 2 is reinforced centrally to form the comparatively flat pocket 3 opening out into the upper half of the circular hose extension 4 and having a slit in the inner wall communicating with the rubber sponge 1.

The rubber sponge 1 is vulcanized to the sheet of rubber 2 and is arranged to partly cover the inner end of the circular hose extension 4 and thereby narrow the mouth of the flat pocket 3.

The circular hose extension 4 is secured to the hose length 6 and this to the valve 10 to which the supply hose is connected.

In the use of this washer the feed tube is connected up as explained and the sponge rubber soaked with water by turning the cock 11 and the surface rubbed. An application of soapy substance or other cleansing material may be made by cutting off the water from the sponge and soaping it and then spreading by means of the sponge over the surface and afterwards turning on the water to gradually clear away the soapy substance. The water may be temporarily shut off by squeezing the inner end of the rubber sponge in such a manner as to close the narrow entrance to the pocket. Similarly the quantity of water may be controlled without having recourse to faucet or other valves.

What I claim is:—

A surface washer comprising a sheet of rubber forming in the central portion a longitudinal and comparatively flat pocket of reinforced construction and opening out at one end of the sheet into the upper half of a circular rubber hose extension and a rubber sponge secured to the aforesaid sheet and communicating with said pocket through the inner wall thereof and extending partly across the circular hose extension to narrow the mouth of the pocket.

Signed at Montreal, Canada, this 3rd day of November, 1922.

LESTER GEORGE CLARK.